(No Model.)
P. BROWNLEY.
ANTI FRICTION BEARING FOR MACHINERY.
No. 300,340. Patented June 17, 1884.
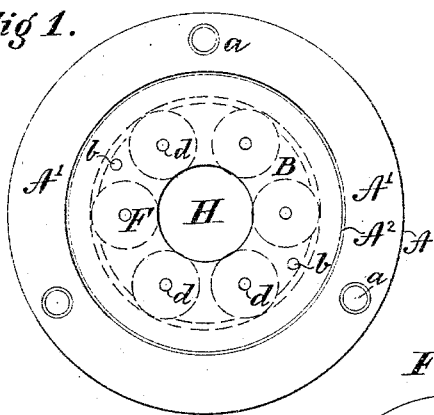
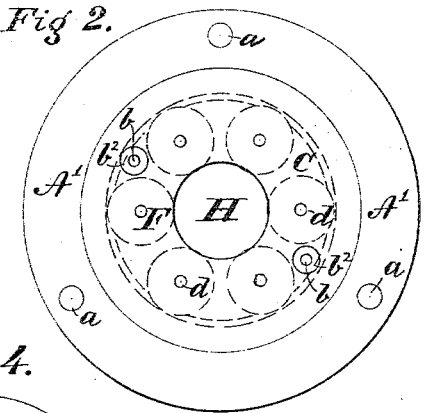
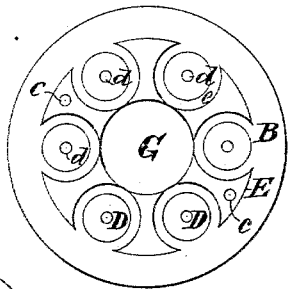
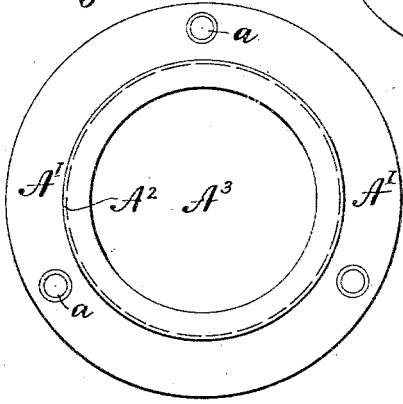
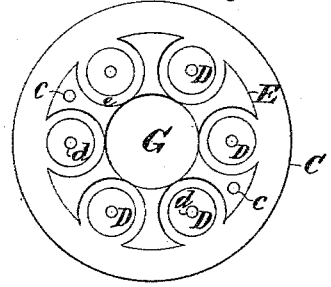
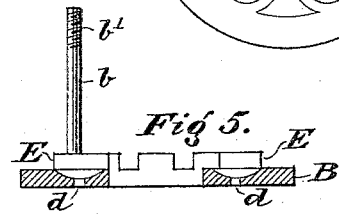
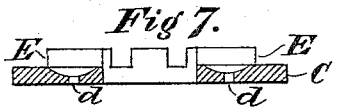
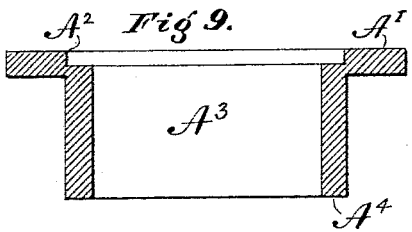
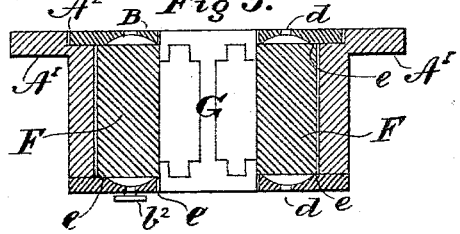
WITNESSES:
INVENTOR
Patrick Brownley
BY Richards
ATTORNEYS.

UNITED STATES PATENT OFFICE.

PATRICK BROWNLEY, OF ST. JOHN, NEW BRUNSWICK, CANADA.

ANTI-FRICTION BEARING FOR MACHINERY.

SPECIFICATION forming part of Letters Patent No. 300,340, dated June 17, 1884.

Application filed November 9, 1883. (No model.)

*To all whom it may concern:*

Be it known that I, PATRICK BROWNLEY, a subject of the Queen of Great Britain and Ireland, residing at St. John, New Brunswick, in the Dominion of Canada, have invented new and useful improvements in anti-friction bearings or roller-bushes for machinery and ships' blocks, pulleys, and other purposes, of which the following is a specification.

My invention relates to anti-friction boxes, bushes, or bearings for machinery and ships' blocks, pulleys, and other purposes, the nature of which will be fully explained by reference to the accompanying specification and the drawings annexed thereto, which form part of the same.

Referring to the drawings, Figure 1 is a front view, and Fig. 2 a back view, of the device complete. Fig. 3 is a vertical section taken on the line $x\,x$, Figs. 1 and 2. Fig. 4 is an internal face view, and Fig. 5 a section, of the plate B. Fig. 6 is an internal view, and Fig. 7 a section, of the plate C. Fig. 8 is a front view, and Fig. 9 a section, of the casting A.

In each of the views similar letters of reference are employed to indicate corresponding parts wherever they occur.

A represents the main shell, frame, or case of the box, bush, or bearing, which is provided with a lateral flange or projection, A', by preference formed circular, as shown in the drawings, and provided with screw-holes $a$, for the passage of rivets, screws, or bolts for the retention of the device in position. The flange or projection A' may, however, be formed in sections or provided with lugs, if desired. The front of the flange or projection A' is countersunk or recessed at $A^2$, for the purpose of receiving a rotating plate, B, which snugly fits said recess, and which is provided with two or more extension rivets, rods, or connections, $b$, passing through the chamber $A^3$, formed within the frame or case A. The rivets, tie rods, or connections $b$ are received into openings $c$, formed in a plate, C, adapted to revolve with the plate B, the bearing of which is against the rear face, $A^4$, of the frame A, which is turned true, so as to avoid friction or twisting of the nest of rollers. The plates B and C revolve together by reason of their connection by means of the rivets or tie-rods $b$. The rivets or tie-rods $b$ are screw-threaded at $b'$, and either provided with screw-nuts $b^2$, or riveted or equivalent devices, for holding the plates B and C correctly in position. The plate B revolves in a recess-bearing formed in the flange, and plate C on a bearing formed on the rear end of the box and against said box, and which plate forms the rear end of the box A. The plates B and C are each formed with a series of recesses, D, which are constructed with oil-jackets, or may be tapering at their extreme ends, and are provided with small apertures $d$, for the purpose of facilitating lubrication, and also for the discharge of dirt or waste oil or matter from the device, and in order to save trimming off ends of rollers and for a guide for milling-tool. Upon each of the plates B and C are projections E, by preference formed by turning out a portion of the casting of the said plates. The projections on each of the plates B and C are adapted to form seats or bearings $e$ for the ends of a series of anti-friction rollers, F, which are arranged around in a circle, so as to leave a central circular aperture, G, for the passage of the shaft H, and so arranged that no two of the rollers come into contact.

The operation of the device is as follows: The shaft H is supported, primarily, by the rollers F, which turn on the shaft H, and are so kept in position by the projections on the plates that they do not touch each other, and the plates revolve with the rollers, thereby avoiding friction. The rollers F being supported in seats $e$ in the plates B and C, which are connected together by the rivets or tie-rods $b$, the said plates B and C will revolve but once to several revolutions of the rollers, and the combined action of the anti-friction rollers F and the plates B and C will prevent or greatly lessen the friction on the shaft H and the shell A.

The plates, rivets, and rollers may also be used in sheaves made of cast-iron or other material in the same manner as described, when used in the shell, frame, or case. Where so used the inside of the sheaf or strap opposite each plate B C must be counterbored, in order to give the plates clearance or space in which to revolve without coming in contact with the sheaf or straps.

Having thus described my invention, what I claim, and desire to secure by Letters Patent, is—

1. An anti-friction bush, box, or bearing provided with a series of revolving rollers supported between plates or disks, said disks being adapted to revolve in independent bearings, substantially as shown and described.

2. An anti-friction box or bearing provided with a series of revolving rollers supported between plates provided with bearing-recesses so arranged that the rollers shall not touch each other, and connected loosely by rivets, rods, or bars in such manner that the said plates also revolve in independent bearings, substantially as shown and described.

3. In an anti-friction box or bushing, the combination, with the casing A, of revolving plates B C, the former adapted to work in a bearing-recess in the casing, and the latter against the end thereof, and a series of rollers, F, arranged in position to support a shaft or ship's blocks, carriage-wheels, or for other suitable purpose, substantially as described.

4. In an anti-friction bush, box, or bearing, the combination, with a fixed case or frame, of a pair of connected revolving disks or plates adapted to work in independent bearings, and a series of anti-friction rollers working in recesses in said plates, substantially as described.

5. An anti-friction bush, box, or bearing adapted to keep the rollers in position and equally apart by means of the recesses and projections on the end of plates B and C, to work in suitable bearings, substantially as described.

6. A casing provided with a recess in one of its ends, and its other end having a non-recessed bearing, in combination with revolving disks secured to each other, and having anti-friction rollers interposed between said disks, substantially as described.

7. The combination of disks having raised projections from their faces, in which are formed recesses for journal-bearings for anti-friction rollers, the said disks having bearings, and being arranged face to face and suitably secured to each other by tie-rods, substantially as set forth.

8. The combination, in a device for lessening friction in journal-bearings, of the plates or disks provided with oil-jackets beyond the bearings of the anti-friction rollers which are between said disks, substantially as shown and described.

9. The combination, in an anti-friction journal-bearing box, of the bearing disks and rollers, the said disks having projecting bearings and recesses therein, the walls of said recesses being cut away so as to permit the ready removal of the rollers when the nest is detached from the box, substantially as set forth.

In witness whereof I have hereunto set my hand this 23d day of October, 1883.

PATRICK BROWNLEY.

Witnesses:
  A. H. DeMill,
  James Straton.